United States Patent
Park et al.

(10) Patent No.: US 8,041,997 B2
(45) Date of Patent: Oct. 18, 2011

(54) APPARATUS AND METHOD FOR MANAGING WIRELESS SENSOR NETWORK

(75) Inventors: Dong-Hwan Park, Daejeon (KR); Yong-Joon Lee, Daejeon (KR); Jong-Hyun Park, Daejeon (KR); Sun Yang Kim, Seoul (KR); Kyung Won Nam, Seoul (KR); Myung Ae Lee, Daejeon (KR); In Kyo Han, Seoul (KR)

(73) Assignees: Electronics & Telecommunications Research Institute, Daejeon (KR); LG CNS, Inc., Seoul (KR)

( * ) Notice: Subject to any disclaimer, the term of this patent is extended or adjusted under 35 U.S.C. 154(b) by 499 days.

(21) Appl. No.: 12/163,487

(22) Filed: Jun. 27, 2008

(65) Prior Publication Data

US 2009/0113232 A1    Apr. 30, 2009

(30) Foreign Application Priority Data

Oct. 31, 2007   (KR) .................. 10-2007-0110062

(51) Int. Cl.
*G06F 11/00* (2006.01)
(52) U.S. Cl. ........................................ 714/27
(58) Field of Classification Search .................. 714/4, 2, 714/37, 27; 709/224
See application file for complete search history.

(56) References Cited

U.S. PATENT DOCUMENTS

| 7,130,870 | B1* | 10/2006 | Pecina et al. ........................... 1/1 |
| 7,613,105 | B2* | 11/2009 | Bahl et al. ...................... 370/216 |
| 2005/0188092 | A1* | 8/2005 | Short et al. .................... 709/227 |
| 2006/0031426 | A1* | 2/2006 | Mesarina et al. ............. 709/220 |
| 2006/0077918 | A1* | 4/2006 | Mao et al. ...................... 370/310 |
| 2006/0082444 | A1* | 4/2006 | Sweeney et al. ............. 340/10.3 |
| 2007/0064625 | A1 | 3/2007 | Lim et al. |
| 2008/0225687 | A1* | 9/2008 | Oksman ........................ 370/201 |

FOREIGN PATENT DOCUMENTS

| KR | 10-2002-0006816 | 1/2002 |
| KR | 1020030035181 A | 5/2003 |
| KR | 10-2007-0033492 | 3/2007 |
| KR | 1020070094858 A | 9/2007 |

OTHER PUBLICATIONS

Jong-Eon Lee, et al., "Autonomous Management of Large-Scale Ubiquitous Sensor Networks",EUC Workshops LNCS 4097, 2006, pp. 609-618, IFIP International Federation for Information Processing (2006).

* cited by examiner

*Primary Examiner* — Scott Baderman
*Assistant Examiner* — Yair Leibovich
(74) *Attorney, Agent, or Firm* — Kile Park Goekjian Reed & McManus PLLC (57) ABSTRACT

An apparatus for managing a plurality of wireless sensor networks selects a configuring policy according to a characteristic of each wireless sensor network and configures a network with the selected configuring policy for management. When an error occurs in the wireless sensor network, the apparatus performs error diagnosis based on a configuring policy applied to the error-detected wireless sensor network, infers a cause of the error, and provides an error recovery method corresponding to the inferred cause of the error to the error-detected wireless sensor network.

6 Claims, 5 Drawing Sheets

APPARATUS AND METHOD FOR MANAGING WIRELESS SENSOR NETWORK

CROSS-REFERENCE TO RELATED APPLICATION

This application claims priority to and the benefit of Korean Patent Application No. 10-2007-0110062 filed in the Korean Intellectual Property Office on Oct. 31, 2007, the entire contents of which are incorporated herein by reference.

BACKGROUND OF THE INVENTION (a) Field of the Invention

The present invention relates to apparatus and method for managing wireless sensor network.

This work was supported by the IT R&D program of MIC/IITA [2006-S-022-02, Development of USN Middleware Platform Technology].

(b) Description of the Related Art

Currently, with the development of computing networking technology and wide-spread use thereof, ubiquitous computing technology and ubiquitous sensor network technology have been in the spotlight as next generation computing technologies. The ubiquitous computing technology is any computing technology that provides all user-desired computing services anywhere and anytime, and is based on a sensor network.

The wireless sensor network is formed of a plurality of wirelessly connected sensor nodes. The sensor nodes have computing capability and wireless communication capability, they autonomously form a network, and they wirelessly exchange sensing information with each other. The wireless sensor network can be used for remote monitoring and controlling purposes.

The wireless sensor network has been separately managed by a gateway or a manager. However, in an environment where a plurality of heterogeneous wireless sensor networks exist, a separate wireless sensor network management method is applied to a wide area server system that manages the plurality of heterogeneous wireless sensor networks so that management complexity increases due to separate configuration and management for each wireless sensor network, and the plurality of wireless sensor networks cannot be provided with a normalized monitoring and diagnosing method and a normalized service environment. Therefore, a method for efficiently managing the plurality of heterogeneous wireless sensor networks is needed.

SUMMARY OF THE INVENTION

The present invention has been made in an effort to provide a wireless sensor network managing apparatus having an advantage of efficiently managing a plurality of wireless sensor networks, and a method thereof.

According to an exemplary embodiment of the present invention, an apparatus for monitoring a plurality of wireless sensor networks is provided. The apparatus includes a monitoring unit, an error diagnosis unit, and a recovery inference engine. The monitoring unit monitors the plurality of wireless sensor networks. The error diagnosis unit selects an error diagnosis software based on a configuring policy applied to an error-detected wireless sensor network among the plurality of sensor networks, and requests the error-detected wireless sensor network to perform error diagnosis by using the selected error diagnosis software. The recovery inference engine receives an error diagnosis result from the error-detected wireless sensor network, infers an error cause from the error diagnosis result, and provides an error recovery method corresponding to the inferred error cause to the wireless sensor network.

According to another exemplary embodiment of the present invention, a method for managing a plurality of wireless sensor networks is provided. In the method, the plurality of wireless sensor networks are monitored, an error diagnosis software is selected on the basis of a configuring policy applied to an error-detected wireless sensor network among the plurality of wireless sensor networks, and the error-detected wireless sensor network is requested to perform error diagnosis by using the selected error diagnosis software.

A method for managing a plurality of wireless sensor networks according to another exemplary embodiment of the present invention includes monitoring the plurality of wireless sensor networks, selecting an error diagnosis software based on a configuring policy applied to a wireless sensor network where an error is detected among the plurality of wireless sensor networks, and requesting the error-detected wireless sensor network to perform error diagnosis by using the selected error diagnosis software.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements. Also, the terms of a unit, a device, and a module in the present specification represent a unit for processing a predetermined function or operation, which can be realized by hardware, software, or a combination of hardware and software.

A wireless sensor network managing apparatus and a method thereof according to an exemplary embodiment of the present invention will now be described in further detail with reference to the drawings.

Figure 1:
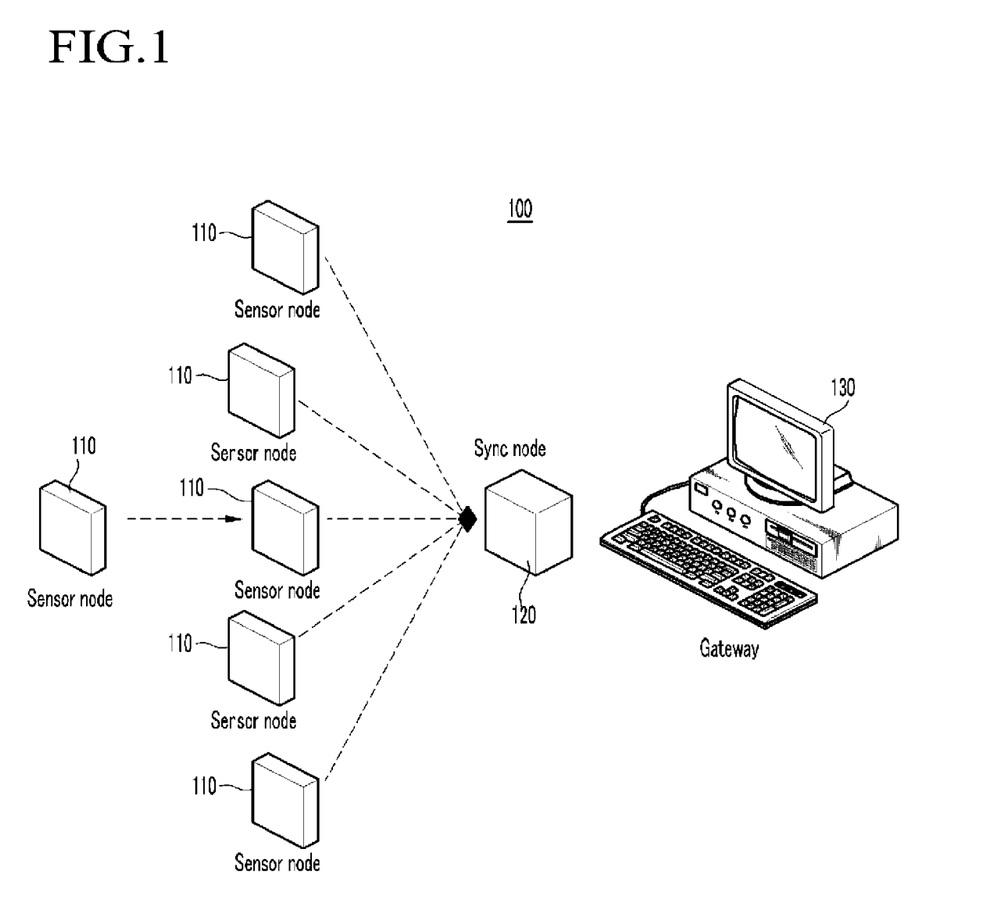
FIG. 1 is a schematic diagram of a wireless sensor network according to an exemplary embodiment of the present invention.

FIG. 1 is a schematic diagram of a wireless sensor network according to an exemplary embodiment of the present invention.

As shown in FIG. 1, a wireless sensor network 100 includes a plurality of sensor nodes 110, a sync node 120, and a gateway 130. FIG. 1 exemplarily shows one sync node, but a wireless sensor network may include two or more sync nodes according to user's setting.

Each of the plurality of sensor nodes 110 collects information on a target area set by its designated user, and transmits the collected information to the sync node 120. The target area information collected by the sensor node 110 includes ambient temperature, humidity, movement of an object, and gas leakage. In this instance, the sensor node 110 may directly transmit the collected target area information to the sync node 120, and may transmit the collected information to the sync node 120 via at least one other sensor node 110 depending on a distance to the sync node 120.

The sync node 120 receives information transmitted from the plurality of sensor nodes 110 and transmits the received information to an external system.

The gateway 130 serves as an interface between the wireless sensor network 100 and the external system and thus sets a secure channel between the wireless sensor network 100 and the external system.

A wireless sensor network managing apparatus as the external system according to the exemplary embodiment of the present invention will be described with reference to FIG. 2.

Figure 2:
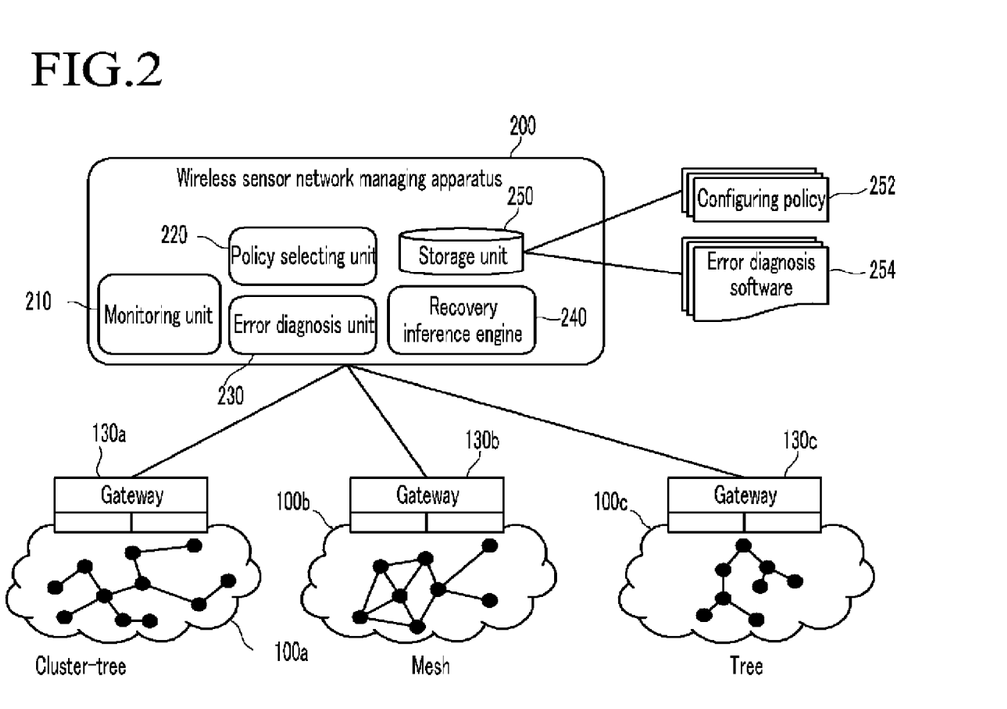
FIG. 2 is a schematic block diagram of a wireless sensor network managing apparatus according to an exemplary embodiment of the present invention.

FIG. 2 is a schematic block diagram of the wireless sensor network managing apparatus according to the exemplary embodiment of the present invention.

As shown in FIG. 2, the wireless sensor network managing apparatus 200 according to the exemplary embodiment of the present invention includes a monitoring unit 210, a policy selecting unit 220, an error diagnosis unit 230, a recovery inference engine 240, and a storage unit 250.

The monitoring unit 210 monitors conditions of a plurality of wireless sensor networks 100a, 100b, and 100c, and collects and manages information of the plurality of wireless sensor networks 100a, 100b, and 100c. FIG. 2 exemplarily shows a cluster-tree network 100a, a mesh network 100b, and a tree network 100c among the plurality of wireless sensor networks that are managed by the wireless sensor network managing apparatus 200 according to the exemplary embodiment of the present invention.

The policy selecting unit 220 selects a configuring policy that exactly reflects a characteristic of each of the wireless sensor networks 100a, 100b, and 100c among configuring policies stored in the storage unit 250, and transmits the selected configuring policy to gateways 130a, 130b, and 130c of the wireless sensor networks 100a, 100b, and 100c for configuration of the wireless sensor networks 100a, 100b, and 100c on the basis of the configuring policy. In this instance, when a manager sets priority on the wireless sensor networks 100a, 100b, and 100c according to policy categories, the policy selecting unit 220 may select a configuring policy that reflects a policy category having the highest priority very well. Herein, prerequisite policy categories for configuration of the wireless sensor networks 100a, 100b, and 100c include a topology configuring method, a wireless channel number, a monitoring cycle, and an operation method.

For example, when configuring a wireless sensor network with 100 ZigBee sensor nodes of a manufacturer A, the policy selecting unit 220 selects a configuring policy that reflects the number of sensor nodes among the configuring policies stored in the storage unit 250 very well in the case that the manager requests configuring policy selection with priority on the number of sensor nodes. Such a configuring policy can be formed of any file that can be most easily represented by using a user interface and can be easily managed and modified. For example, a configuring policy can be stored as an XML file in the storage unit 250 and managed by the storage unit 250.

The policy selecting unit 220 manages wireless sensor networks by using a management table as shown in Table 1. Table 1 includes management information described in the selected configuring policy and the management information includes a topology configuring method, a wireless sensor network location, a policy identification (ID) of a selected configuring policy, a wireless channel number, a frequency band, a location coordinate of a wireless sensor network, a wireless sensor network range, and so forth.

TABLE 1

| Sensor network ID | Policy ID | Wireless channel No. | Topology | Location coordinate | Range | ... |
|---|---|---|---|---|---|---|
| 0x012981626 | 0x0014 | 0x02 | TREE | x = 28.48  y = 2.528 | 10 m | |
| 0x012981725 | 0x2F24 | 0x08 | TREE | x = 28.41  y = 2.552 | 100 m | |
| 0x12982759 | 0x00C1 | 0x0A | MESH | x = 0.034  y = 0.192 | 50 m | |
| ... | ... | ... | ... | ... | ... | ... |

Referring to Table 1, the wireless sensor network ID of "0x012981626" and the wireless sensor network ID of "0x012981725" have similar location coordinate values. This implies that the two wireless sensor networks are located close to each other. In this instance, a stable radio channel cannot be guaranteed due to radio channel interference, and battery power can be wasted due to unnecessary retransmission when the two wireless sensor networks use the same radio channel number. Therefore, the policy selecting unit 220 allocates the most reliable radio channel number based on the location coordinate and the range of each of the wireless sensor networks 100a, 100b, and 100c, which are managed by the wireless sensor network managing apparatus 200, so as to avoid radio channel interference between adjacent wireless sensor networks. As described, the policy selecting unit 220 can reallocate optimal management information based on the wireless sensor network management information when a new wireless sensor network is added.

In addition, the policy selecting unit 220 periodically monitors a mobile wireless sensor network so as to maintain the management information.

The error diagnosis unit 230 manages error diagnosis software that can diagnose errors in the wireless sensor networks 100a, 100b, and 100c according to a configuration method and a configuring policy of the wireless sensor networks 100a, 100b, and 100c, selects error diagnosis software that can diagnose an error of an error-detected wireless sensor network based on a configuration method and a configuring policy of the error-detected wireless sensor network, and transmits the selected error diagnosis software.

The error diagnosis unit 230 manages an error diagnosis software ID and priority information of the error diagnosis software for each configuring policy by using a management table as shown in Table 2. Accordingly, the error diagnosis unit 230 selects error diagnosis software that corresponds to the configuring policy of the respective wireless sensor networks 100a, 100b, and 100c based on priorities set in the management table. The priority of the error diagnosis software may be set by the manager, and the manager can determine the priority of the error diagnosis software in consideration of a characteristic of a wireless sensor network to which the corresponding configuring policy is applied. For example, when the wireless sensor networks 100a, 100b, and 100c are located in a place (e.g., a mountainous area or a skyscraper area) where difficulties may occur in wireless communication, the manager sets the highest priority on error diagnosis software that can most efficiently diagnose a communication error.

Although the error diagnosis software is executed with the highest priority, error diagnosis for the corresponding wireless sensor network may not be perfectly performed. In this case, the error diagnosis unit 230 selects the next prioritized error diagnosis software and transmits the selected software to the gateway 130.

TABLE 2

|  | Error diagnosis software ID | Priority | ... |
|---|---|---|---|
| Policy ID (0x0014) | 0x0001 | 1 | ... |
|  | 0x0002 | 2 | ... |
|  | 0x0003 | 3 | ... |
|  | ... | ... | ... |

Table 2 shows an error diagnosis software ID that can be used for the policy ID of "0x0014" and a priority of the corresponding error diagnosis software, but the error diagnosis unit 230 can manage other configuring policies described in Table 1 by using a management table as shown in Table 2. In this case, the number of error diagnosis software IDs and the priority of the corresponding error diagnosis software ID can be changed in accordance with characteristics of the wireless sensor networks 100a, 100b, and 100c.

The recovery inference engine 240 infers a cause of the error based on an error diagnosis result of the wireless sensor networks 100a, 100b, and 100c.

The storage unit 250 stores a configuring policy and error diagnosis software according to a characteristic of each of the wireless sensor networks 100a, 100b, and 100c. The configuring policy includes a network policy and an application policy. The network policy includes information that reflects a network characteristic, and the information includes a physical size of a wireless sensor network, the number of configuring sensor nodes, a hardware manufacturer of a sensor node, a product number, and a communication method. The application policy includes information that reflects an application characteristic, and the information includes a field of application, a business model, information on whether to accept a location-based query, and information on whether to support a mobile sensor network.

Figure 3:
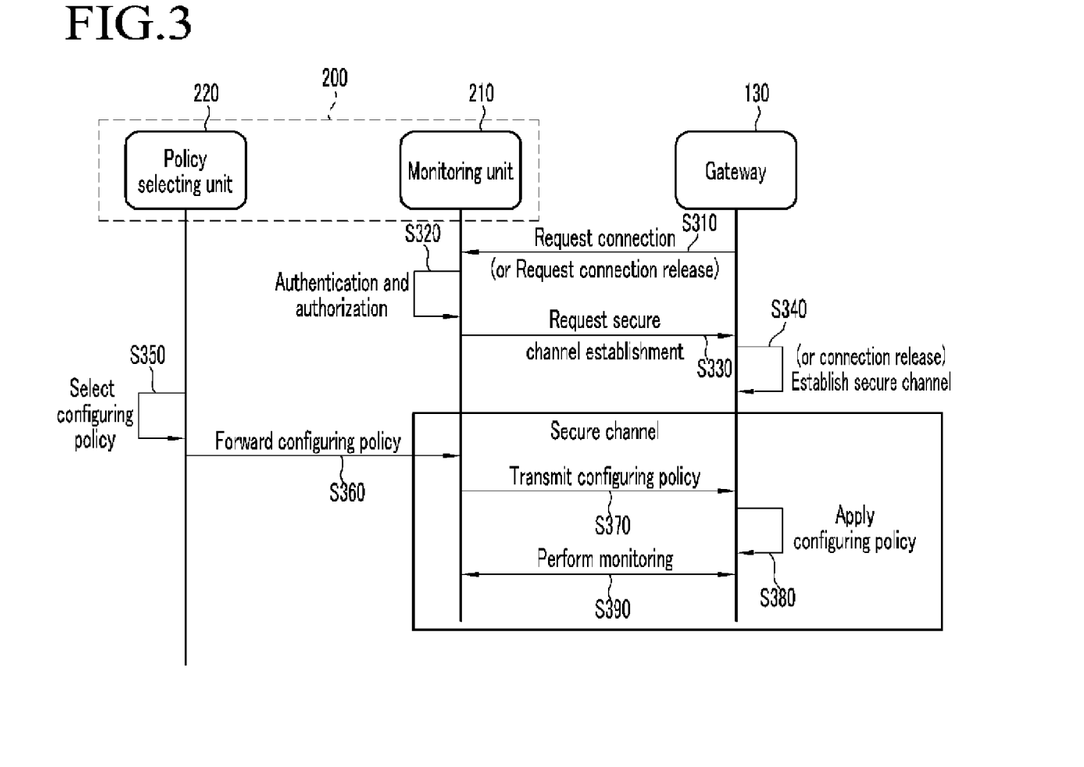
FIG. 3 is a flowchart of a communication method between the wireless sensor network managing apparatus and a wireless sensor network according to the exemplary embodiment of the present invention.

FIG. 3 shows a communication method between the wireless sensor network managing apparatus and the wireless sensor network according to the exemplary embodiment of the present invention.

As shown in FIG. 3, the gateway 130 requests connection to a wireless sensor network 100 that is managed by the gateway 130 from the monitoring unit 210 of the wireless sensor network managing apparatus 200 (S310). The gateway 130 can transmit such a connection request to the wireless sensor network managing apparatus 200, or the wireless sensor network managing apparatus 200 can transmit the connection request to the gateway 130 through an available network port (e.g., an HTTP port). When the connection request is transmitted from the wireless sensor network managing apparatus 200 to the gateway 130, the gateway 130 receives the connection request from the monitoring unit 210 and transmits a response for the connection request to the m monitoring unit 210.

When receiving a wireless sensor network connection request from the gateway 130, the monitoring unit 210 performs authorization/authentication of the wireless sensor network (S320). In this instance, the monitoring unit 210 requests connection cancellation when the wireless sensor network is not properly authorized to access the wireless sensor network managing apparatus 200, and when the wireless sensor network is properly authorized to access the wireless sensor network managing apparatus 200, the monitoring unit 210 requests the gateway 130 to establish a secure channel for communication (S330).

The gateway 130 performs connection cancellation when receiving the connection cancellation request from the monitoring unit 210, and establishes an authorized secure channel when receiving the secure channel establishment request from the monitoring unit 210 (S340). In this instance, the gateway 130 sets a secure channel by using a specific port number rather than a public port such as the HTTP. In addition, information transmitted/received through the secure channel is encrypted by using an encryption algorithm and then transmitted. When receiving the encrypted information, the monitoring unit 210 and the gateway 130 decode the encrypted information (the encryption process is not shown) by using a well-known encryption/decryption algorithm.

The policy selecting unit 220 of the wireless sensor network managing apparatus 200 selects a configuring policy that best reflects a characteristic of the corresponding wireless sensor network (S350), and transmits the selected configuring policy to the monitoring unit 210 (S360).

The monitoring unit 210 transmits the configuring policy transmitted from the policy selecting unit 220 to the gateway 130 through the established secure channel (S370), and the gateway 130 configures a wireless sensor network with application of the selected configuring policy (S380).

Then, the monitoring unit 210 monitors the wireless sensor network so as to collect information on the wireless sensor network (S390).

A method for diagnosing and recovering an error detected in a specific wireless sensor network during a wireless sensor network monitoring process will be described with reference to FIG. 4.

Figure 4:
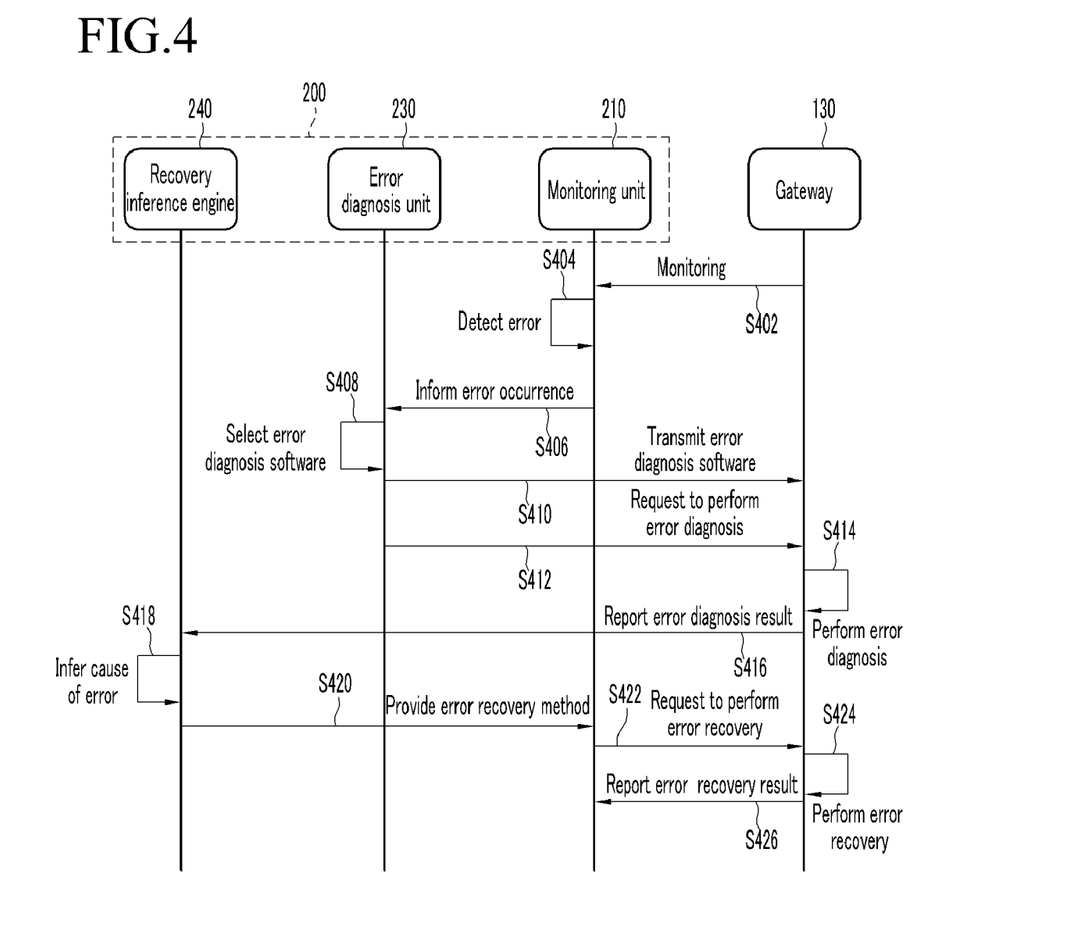
FIG. 4 is a flowchart of an error diagnosis method and an error recovery method of the wireless sensor network managing apparatus according to the exemplary embodiment of the present invention.

FIG. 4 is a flowchart of an error diagnosis and recovery method of the wireless sensor network managing apparatus according to the exemplary embodiment of the present invention.

As shown in FIG. 4, the monitoring unit 210 of the wireless sensor network managing apparatus 200 monitors the wireless sensor network through the gateway 130 of the wireless sensor network (S402). When detecting an error in the wireless sensor network from the gateway 130 (S404), the monitoring unit 210 informs the error of the wireless sensor network to the error diagnosis unit 230 of the wireless sensor network managing apparatus 200 (S406). The gateway 130 may detect an error of the wireless sensor network. When detecting the error of the wireless sensor network, the gateway 130 informs the detected error to the monitoring unit 210.

The error diagnosis unit 230 selects error diagnosis software from the storage unit (250 of FIG. 2) of the wireless sensor network managing apparatus 200 based on configuration information and a configuring policy of a wireless sensor network having an error so as to diagnose the wireless sensor network (S408), and transmits the selected error diagnosis software to the gateway 130 through the secure channel (S410). After that, the error diagnosis unit 230 remotely requests the gateway 130 to perform error diagnosis (S412), and the gateway 130 runs the transmitted error diagnosis software to perform the error diagnosis on the wireless sensor network (S414).

When the error diagnosis of the wireless sensor network is completed through the above-described process, the gateway 130 reports an error diagnosis result to the recovery inference engine 240 of the wireless sensor network managing apparatus 200 (S416), and the recovery inference engine 240 infers a cause of the error with a probability value from the error diagnosis result by using probability information of the Bayesian network (S418). When inferring the cause of the error, the recovery inference engine 240 considers configuring policy information of the wireless sensor network, which is a configuring method of the wireless sensor network, a topology, hardware information of a sensor node, and a manufacturer.

Based on the inferred cause of the error, the recovery inference engine 240 transmits a proper error recovery method to the monitoring unit 210 (S420), and the monitoring unit 210 requests the gateway 130 to perform error recovery by using the transmitted error recovery method (S422). Then, the gateway 130 performs the error recovery (S424). When the error recovery process cannot be performed by the gateway 130 and thus requires manual operation, the manager or a site worker can manually recover the error.

After performing the error recovery, the gateway 130 reports an error recovery result to the monitoring unit 210 (S426). The manager determines whether the error cause inference is properly performed and whether a proper recovery method is used, and reflects probability values of the corresponding error cause and the recovery method to thereby increase inference reliability.

For example, in verification of the reliability of the error diagnosis unit 230, the priority of the error diagnosis software is not changed if the error diagnosis software having the first priority results in a successful error diagnosis result. When the error diagnosis software having the first priority does not result in a successful diagnosis result or results in an inaccurate error diagnosis result and thus error diagnosis software having the second priority is performed, the error diagnosis software having the second priority is given the first priority if it reports a successful diagnosis result. That is, the manager changes a pair of the error diagnosis software ID and the corresponding priority managed by using the table of Table 2. By performing the reliability verification through the above-described method, more reliable and more prompt error diagnosis software can be transmitted when an error occurs in the corresponding wireless sensor network.

In addition, in verification of the reliability of the recovery inference engine 240, when the error of the wireless sensor network is perfectly recovered through the error recovery result transmitted from the gateway 130, the manager increases a ratio of a random variable of the probability for the cause of the corresponding error to thereby increase reliability of the recovery inference engine 240. Herein, the random variable implies a random variable for a case that causes the recovered error.

On the other hand, when the recovery result is unsuccessful, the reliability is guaranteed by decreasing the ratio of the corresponding random variable. The ratio of the random variable can be changed as given in Equation 1.

$$p = \alpha \times p \left(0 < \alpha \leq \frac{1}{p}\right) \qquad \text{[Equation 1]}$$

As shown in Equation 1, the corresponding random variable, denoted as p, can be increased by using $\alpha$ according to an error recovery result. The value of $\alpha$ is input by the manager, and the corresponding random variable p increases as the value of $\alpha$ increases. The value of $\alpha$ is greater than zero and equal to or less than 1/p. A random variable corresponding to the random variable p has a value of 1−p. The manager changes the random variable by properly controlling the value of $\alpha$ according to the error recovery result so as to increase the reliability of the recovery inference engine 240.

A method for the recovery inference engine 240 to infer an error cause based on the probability information of the Bayesian network will now be described with reference to FIG. 5.

Figure 5:
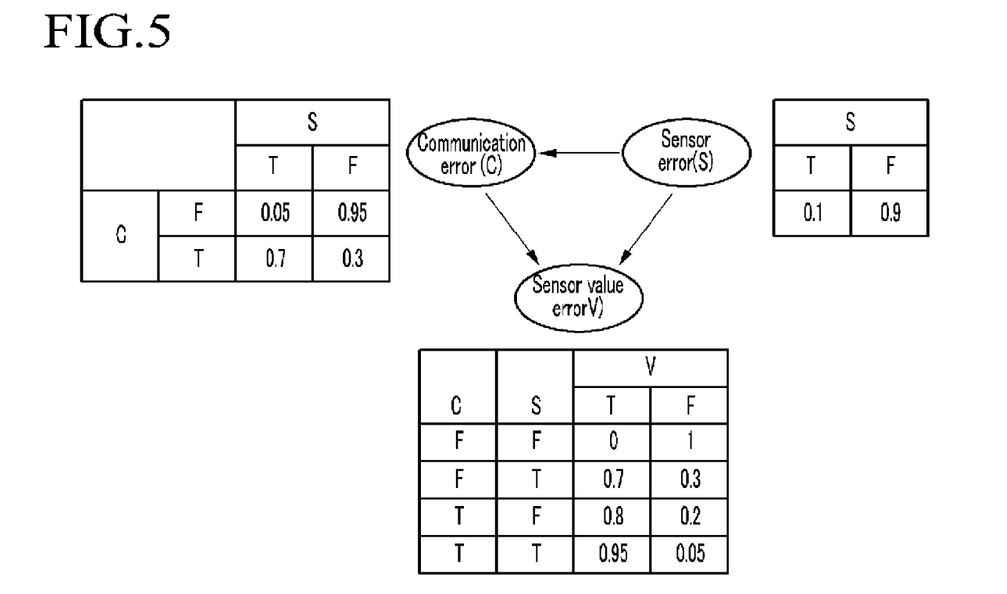
FIG. 5 shows a method for inferring a cause of a sensing value error of a sensor by using the Bayesian network according to an exemplary embodiment of the present invention.

FIG. 5 shows a method for inferring a cause of an error in a sensing value of a sensor node by using the Bayesian network according to the exemplary embodiment of the present invention. In FIG. 5, it is assumed that an error V in a sensing value is caused by a communication error C and a sensor error S, and the sensor error S causes the communication error C. Such a relationship can be modeled by the Bayesian network of FIG. 5, and all variables have a value of either true (T) or false (F).

Referring to FIG. 5, the probability T of occurrence of an error in a sensor node (110 in FIG. 1), that is, the sensor error S, is 0.1, and the probability F that the sensor error does not occur is 0.9. In a like manner of the above, when the sensor error S occurs, the probability T that the communication error C occurs is 0.05 and the probability F that the communication error C does not occur is 0.7. In addition, when the sensor error S does not occur, the probability that the communication error C occurs is 0.3 and the probability that the communication error C does not occur is 0.95.

Similar to the above-described method, when the sensor error S and the communication error C do not occur, the probability that the sensing value error V occurs is 0 and the probability that the sensing value error V does not occur is 1. When the sensor error S occurs and the communication error C does not occur, the probability that the sensing value error V occurs is 0.7 and the probability that the sensing value error V does not occur is 0.3. When the sensor error S does not occur and the communication error C occurs, the probability that the sensing value error V occurs is 0.8 and the probability that the sensing value error V does not occur is 0.2. When the sensor error S and the communication error C occur, the probability that the sensing value error V occurs is 0.95 and the probability that the sensing value error V does not occur is 0.05.

On the basis of the above-described information, when the sensing value error V of the specific sensor node (110 of FIG. 1) occurs, the probability that the sensor error S causes the sensing value error V of the specific sensor node can be inferred as given in Equation 2.

$$P(S = T \mid V = T) = \qquad \text{[Equation 2]}$$
$$\frac{P(V = T, S = T)}{P(V = T)} = \frac{\sum_{C \in \{T,F\}} P(V = T, C, S = T)}{\sum_{C, S \in \{T,F\}} P(V = T, C, S)} =$$
$$\frac{0.0035 + 0.0665}{0 + 0.0035 + 0.216 + 0.0665} \approx 0.2445$$

From Equation 2, the probability that the sensor error S causes the sensing value error V is calculated to be 24.5%, and the probability that the communication error C causes the sensing value error V is calculated to be 98%. Therefore, it can be inferred that the communication error C very likely causes the sensing value error V.

As described above, the recovery inference engine 240 can infer a cause of an error by calculating a probability of a cause of the error with the Bayesian network, and can infer a cause when a specific variable has an unexpected value during a monitoring process through the same manner as described above so that malfunctioning or errors that can occur in the future can be prevented.

According to the exemplary embodiments of the present invention, a plurality of wireless sensor networks are monitored so that management and error detection for the plurality of sensor networks can be integrally performed. In addition, the error-detected wireless sensor network is provided with error diagnosis, error cause inference, and error recovery methods according to a configuring policy of the network, and reliability of the error diagnosis, error cause inference, and error recovery methods can be guaranteed by performing reliability verification according to an error recovery result. Further, malfunctioning or errors that can occur in the future can be promptly and accurately handled, thereby enabling efficient management.

In addition, not only the substantial error but also malfunctioning or errors that can occur in the future can be inferred on the basis of information collected through the monitoring process so that a wireless sensor network error can be prevented.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for managing a plurality of wireless sensor networks, the apparatus comprising:
a monitoring unit monitoring the plurality of wireless sensor networks;
a storage unit storing a plurality of configuring policies, wherein each configuring policy is associated with at least one error diagnosis software;
a policy selection unit selecting a configuring policy to be applied to each of the wireless sensor networks based on a characteristic of the corresponding wireless sensor network among the plurality of configuring policies stored in the storage unit;
an error diagnosis unit selecting an error diagnosis software stored in the storage unit based on at least one configuring policy stored in the storage unit associated with a wireless sensor network where an error is detected by the monitoring unit among the plurality of wireless sensor networks, and requesting the error-detected wireless sensor network to perform error diagnosis by using the selected error diagnosis software stored in the storage unit; and
a recovery inference engine receiving an error diagnosis result from the error-detected wireless sensor network, inferring an error cause from the error diagnosis result, and providing an error recovery method corresponding to the inferred error cause to the error-detected wireless sensor network.

2. The apparatus of claim 1, wherein the error diagnosis unit manages at least one of error diagnosis software that can be used for the configuring policy and application priority of the at least one error diagnosis software, and the error diagnosis software is selected in accordance with the application priority.

3. The apparatus of claim 2, wherein the error diagnosis unit receives an error recovery result from the error-detected wireless sensor network, and changes application priority of the at least one error diagnosis software based on the received error diagnosis result.

4. The apparatus of claim 1, wherein the recovery inference engine infers the error cause by using a Bayesian network.

5. The apparatus of claim 1, wherein the monitoring unit monitors the wireless sensor networks after applying the respective selected configuring policies to the respective wireless sensor networks.

6. The apparatus of claim 5, wherein the monitoring unit encrypts the configuring policy through a secure channel connected with each of the wireless sensor networks and transmits the encrypted configuring policy to each of the wireless sensor networks.

* * * * *